United States Patent
Lau (12) 
(10) Patent No.: US 6,631,890 B1
(45) Date of Patent: Oct. 14, 2003

(54) PACKING FOR COLUMN

(75) Inventor: Philip Y. Lau, Houston, TX (US)

(73) Assignee: Apollo Separation Technologies, Inc, Houston, TX (US)

( * ) Notice: Subject to any disclaimer, the term of this patent is extended or adjusted under 35 U.S.C. 154(b) by 0 days.

(21) Appl. No.: 09/608,579

(22) Filed: Jun. 30, 2000

(51) Int. Cl.[7] .................................................. B01F 3/04
(52) U.S. Cl. ................... 261/94; 261/95; 261/DIG. 72; 95/211
(58) Field of Search .......................... 261/94, DIG. 72, 261/95; 96/290; 95/211, 212

(56) References Cited

U.S. PATENT DOCUMENTS

| | | | | |
|---|---|---|---|---|
| 96,842 A | * | 11/1869 | Shaler | ................. 261/DIG. 72 |
| 2,594,585 A | * | 4/1952 | Ridgway, Jr. | ......... 261/DIG. 72 |
| 3,924,807 A | * | 12/1975 | Morgan | ................ 261/DIG. 72 |
| 4,005,010 A | * | 1/1977 | Lunt | .................... 261/DIG. 72 |
| 4,200,532 A | * | 4/1980 | Iwatani et al. | ........ 261/DIG. 72 |
| 4,487,727 A | * | 12/1984 | Ballato, Jr. | ........... 261/DIG. 72 |

FOREIGN PATENT DOCUMENTS

| | | | | |
|---|---|---|---|---|
| RU | 441028 | * | 12/1974 | ................... 261/94 |
| WO | WO 93/05876 | * | 4/1993 | ........... 261/DIG. 72 |

* cited by examiner

*Primary Examiner*—C. Scott Bushey
(74) *Attorney, Agent, or Firm*—John R. Casperson (57) ABSTRACT

Column packing elements comprise and preferably consist of two individual components, namely a strong and rigid "outside" cage, and an "inside" variable component preferably formed of a monofilament and/or mono-multi-filament fibers, which can be varied to produce a significant increase in surface area of the known art in random packings.

11 Claims, 3 Drawing Sheets

PACKING FOR COLUMN

BACKGROUND OF THE INVENTION

In one aspect, this invention relates to random or dumped packings. In another aspect, this invention to a method of making such packings. In a further aspect, this invention relates to a column containing such packings. In a still further aspect, this invention relates to the use of a column containing such packings.

Column packings such as are used in the chemical and petrochemical industries are generally divided into three classes, namely a) Random or dumped packings:

These are discrete pieces of packing of a specific geometrical shape, which are dumped or randomly packed into the column shell.

b) Structured or systematically arranged packings:

These are crimped layers of wire mesh or corrugated sheets. Sections of these packings are stacked in the column.

c) Grids:

These are also systematically arranged packings, but instead of wire-mesh or corrugated sheets, these grid-packings use an open-lattice structure.

The field of this invention is random or dump packings. For this application, the earliest engineers used tree barks and round-shape pebbles as dump packing materials for their chemical processing industries (CPI). There are three generations of evolution in random packings:

The first generation of random packing saw use from 1907 to the 1950s. Two basic simple shapes were widely used; namely the Raschig® ring (first patented by Dr. Raschig in Germany in 1907) and the Berl® saddle, that became the ancestors of modern random packings. These packings have all been superseded by today's modern packings, and are seldom used in today's CPI.

The second generation of random packings were developed from the late 1950's to the early 1970's. During this period, there were two popular geometrical shapes, namely the Pall® ring, which evolved from the Raschig® ring, and the Intalox® saddle, which evolved from the Berl saddle. The second generation packings are still popular and extensively used in modern CPI today.

The third generation random packings have seen use since the mid 1970's. Third generation packing has produced a multitude of popular geometries, most of which evolved from the Pall ring and Intalox® saddle, both in metallic and in plastic materials. Popular brand names are as follows: Intalox® Metal Tower Packing (IMTP®), marketed by Norton Company, Cascade® Mini-Rings (CMR®) and CMR® Turbo, both marketed by Glitsch, Inc., Chempak® or Levapak (LVK®) available in metal from Nuttering Engineering Corporation and in plastic and other nonmetals from Chemetics International, Nutter Rings®, available in metal and plastic, marketed by Nutter Engineering Corporation, HcKp®, marketed by Koch Engineering Company, Inc., Fleximax®, available in metal from Koch Engineering Company, Inc., Hiflow® ring, available in metal, plastic and ceramics from Rauschert Industries, Inc., Jaeger Tri-Packs®, available in metal as Metal Jaeger Top-Pak® and plastic as Hackette® from Jaeger Products, Inc., NOR PAC® (NSW) rings, available in plastic from Nutter Engineering Corporation and from Jaeger Products, Inc., Intalox® Snowflake® packing, available in plastic from Norton Company, LANPAC®, available in plastic from Lantec Products, Inc., IMPAC®, available in metal and plastic from Lantec Product, Inc., VSP®, available from Jaeger Products, Inc., and Interpack®, available from Jaeger Products, Inc., Others packings, for example Tellerette®, Maspac®, Dinpak®, SuperTorus® Saddle, Hiflow® Saddle, Ralu® Ring, ENVIPAC®, Super Levapak (S-LVK®) etc. are also widely used in modern CPI.

One of the leading challenges for improving the known art of random packings is to increase in the total available surface areas of the packing materials.

By increasing the surface area of packings, more liquid loading (in terms of gallons per minute per square feet) can be achieved, which in return can improve the reaction efficiency at the wetting surface of a gas stream and a liquid stream, as in the example of a toxic gas scrubber process, or for liquid feed streams in a distillation column operation.

Raschig rings, which started the age for first generation of random packings, are much more consistent and provide more predictable end results than tree barks and pebble stones. With increases in surface areas, then came the Bert Saddle packings, which outperform the Raschig rings in fluid flow hydrodynamics and performance efficiencies.

Up until the early 1970s, the second generation random packings came with significant efficiency improvement over the earlier first generation packings, simply by changing the geometrical shape of both the Raschig ring and Berl saddle to provide an increase in surface area over the previous ones. The two main representatives of the second-generation random packings are the Pall® ring and the Super Intalox® saddle.

The third generation random packings approximately started from early 1970s till today. The CPI saw a stream of constant newer random packings being introduced on yearly basis. Every time a new random packing enters the market stage, we see a clear sign that each entry of this newer random packing has tried to outdo its competitors by introducing a more intricate network of ribs, rods, struts and pointed fingers, mostly all cross-linked and uniformly spaced throughout the open-structural framework, with the ultimate goal of increasing in the surface area of the random packing, thus increase in performance and efficiency.

On the other hand, there is a common "dark" side in many of today's third generation random packings. In order to increase the surface area, the packing materials become more complex in geometrical shapes, resulting in more individual breakage, less structural rigidity, and more interlocking inside a CPI column. The dilemma facing today's random packings is how to significantly increase the surface area without sacrificing the structural integrity of the individual random packing.

No matter how smart a design engineer, carving out more space to produce more surface area from a solid spherical or cylindrical material like metals or plastics will always weaken structural integrity. The more complex the geometrical shapes, the more surface area and the damage to the structural integrity of the random packings.

It is an object of this invention to provide higher surface area for a column packing without loss of integrity.

SUMMARY OF THE INVENTION

One embodiment of my invention provides new type of random packing materials. The packing elements comprise and preferably consist of two individual components, namely a strong and rigid "outside" cage, and an "inside" variable component preferably formed of a monofilament and/or mono-multi-filament fibers, which can be varied to produce a significant increase in surface area of the known art in random packings.

In another embodiment, a packing element comprises a cage portion and a packing portion. The cage portion which possesses a crush strength sufficient to withstand crushing forces to be encountered when the packing element is deployed in a column. The packing portion is positioned in the cage portion and provides the packing element with more than half of its surface area.

In another embodiment, there is provided a method for making a dump packing element by providing a rigid cage assembly and stuffing the rigid cage assembly with a mesh or fibrous stuffing material.

In another embodiment, a chemical process column is provided with a multiplicity of packing elements positioned inside of said column, wherein each of said packing elements comprises a packing body surrounded by a protective cage assembly.

In another embodiment, there is provided a method for packing a column with a high surface area material which comprises introducing a multiplicity of packing elements into said column, each of said packing elements comprising a packing body having a high surface area/mass ratio surrounded by a protective cage assembly.

In another embodiment, there is provided a method of effecting gas/liquid contacting in a column. A liquid stream is introduced into an upper end of the column and flowed downwardly through a packing in the column. A gas steam is introduced into a lower end of the column and flowed upwardly through the packing in the column for countercurrent contact with the liquid stream. The packing is composed of cages each of which contains a low apparent bulk density, high surface area, packing body.

DETAILED DESCRIPTION OF THE INVENTION

Figure 1:
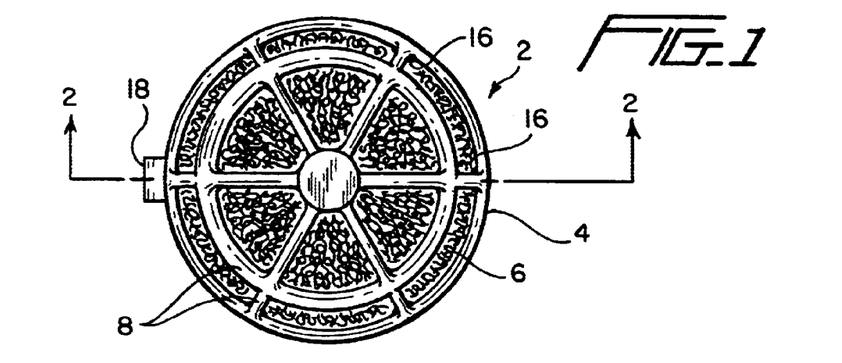
FIG. 1 is a top view of a dump packing element according to one embodiment, with the inside component shown schematically.
Figure 2:
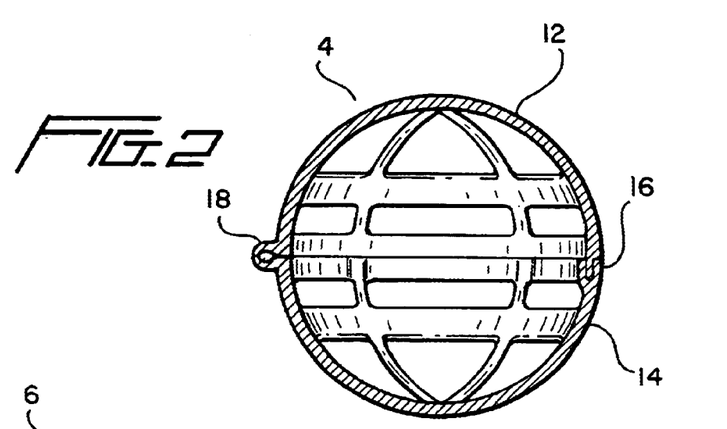
FIG. 2 is a cross-sectional view taken along lines 2—2 of the element shown in FIG. 1, with the internal component removed.

According to one embodiment of the invention, a packing element 2 comprises a cage portion 4 and a packing portion 6. The cage portion which possesses a crush strength sufficient to withstand crushing forces to be encountered when the packing element is deployed in a column. The packing portion is positioned in the cage portion and provides the packing element with more than half of its surface area.

Figure 3:
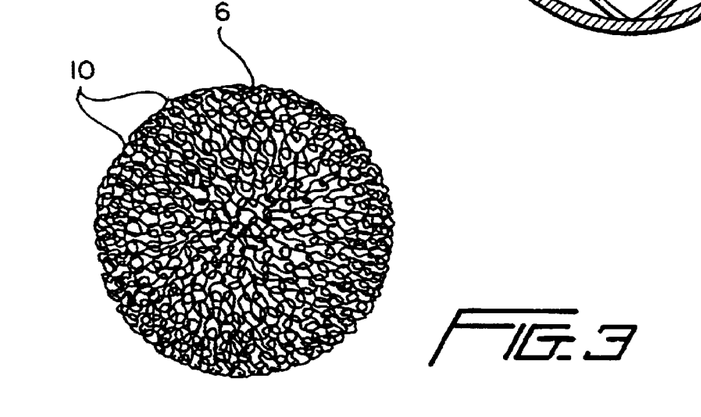
FIG. 3 is a pictorial representation of the internal component of the dump packing element shown in FIG. 1.

The cage portion is generally formed by a mechanical network of structural elements 8, and the packing portion is generally formed of an extruded material 10. The cage portion preferably has an outside configuration and a size which permits it to be dumped randomly and evenly into a column.

Generally speaking the cage portion is generally spherical, cylindrical or polyhedral and has a maximum through-dimension in the range of about 0.5 inches to about 12 inches. In a preferred embodiment, the cage portion is generally spherical and has a maximum through-dimension in the range of about 1 inch to about 6 inches.

For the spherical embodiment, the cage portion preferably comprises a pair of generally hemispherical molded cage elements. Preferably, the generally hemispherical cage elements snap together. In the illustrated embodiment, the pair of generally hemispherical cage elements comprises an upper cage element 12 and a complementary lower cage element 14. The upper cage element and the lower cage element each has an open mouth which defines a periphery and the upper cage element and the lower cage element are joined in a mouth to mouth relationship by snap fitting elements 16. The snap fitting elements are preferably positioned as pairs of interlocking snap fitting elements along the mouth peripheries of the cage elements.

In a further preferred embodiment, the upper cage element is further joined to the lower cage element by a hinge 18 to facilitate interlocking the snap fitting elements. In a further preferred embodiment, the generally hemispherical cage elements have structural elements positioned along lines of longitude and latitude. As size increases, the number of structural elements will also generally increase.

Good results can be obtained where the cage portion is formed from thermoplastic. This permits the cage element to be injection molded and also facilitates the provision of a living hinge 18. Generally speaking, a thermoplastic cage portion will have a crush strength in the range of about 10 to about 200 pounds. Metallic or engineering plastic cages can be made stronger if desired.

The packing portion 6 is generally formed from a network of strands. The network can be of woven or nonwoven form. Good results can be obtained where the packing portion is formed from a tubular section of woven net. The strands can be constructed of any desired material. Thermoplastic material or metal can be expected to provide good results. The cage portion prevents the packing portion from being crushed when the packing element is deployed in a column.

In another embodiment of the invention, there is provided a method for making a dump packing element by providing a rigid cage assembly and stuffing the rigid cage assembly with a mesh or fibrous stuffing material. The rigid cage assembly preferably comprises a first cage half having snap fitting elements and a second cage half having complementary snap fitting elements. Where snap fitting elements are employed the cage assembly is further closed by bringing the snap fitting elements together, preferably so as to interlock. Generally speaking, the fibrous stuffing material is in entangled or woven form. In such instance, it is generally necessary to compress the body of the fibrous stuffing material to insert it into the cage. Where the cage is constructed of halves, the halves are preferably joined with a flexible hinge which is integral with the first cage half and the second cage half. The cage is closed by folding the flexible hinge.

Figure 4:
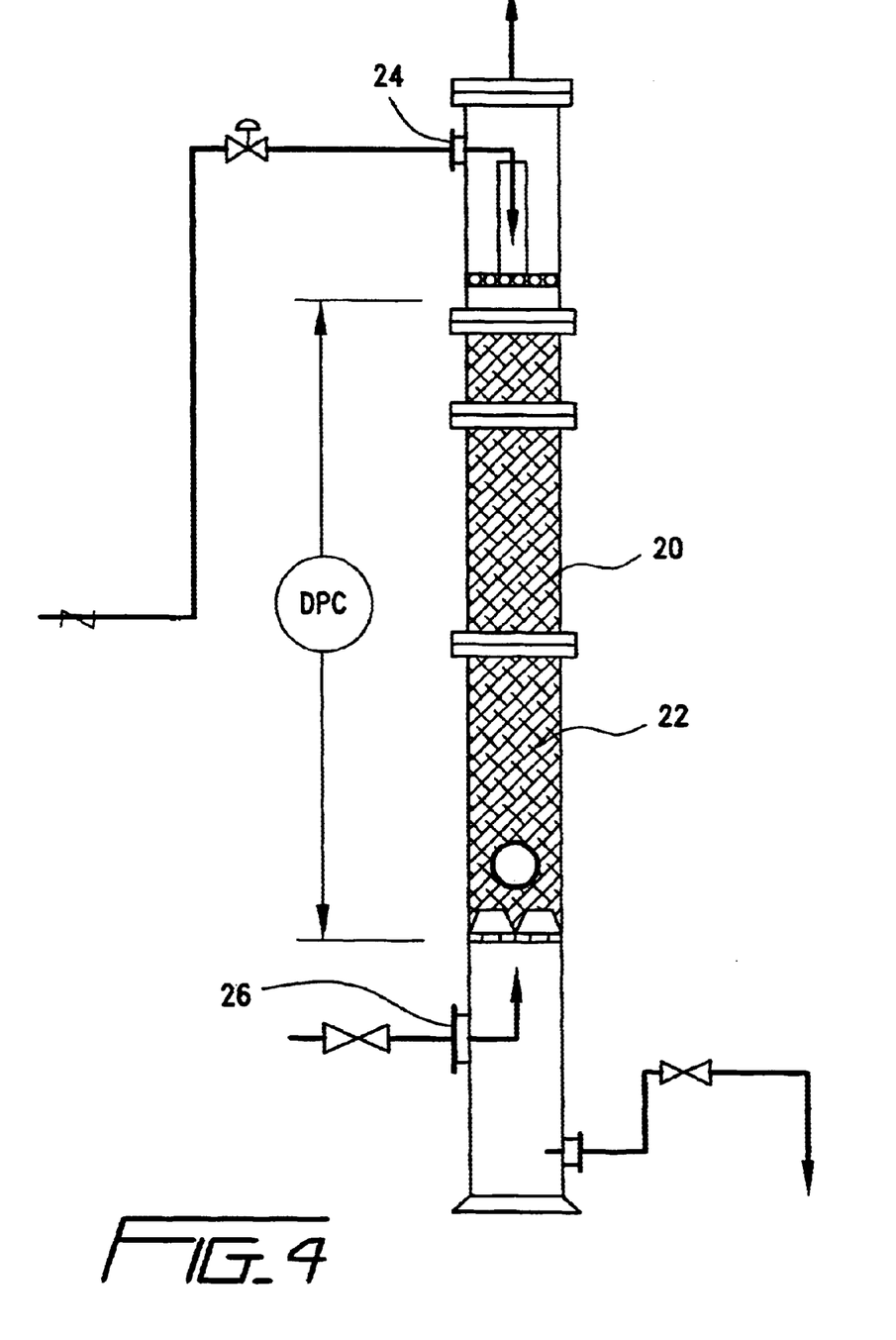
FIG. 4 is a schematic representation of a column containing dump packing elements according to another embodiment of the invention.

In another embodiment, a chemical process column is provided 20 with a multiplicity of packing elements 22 positioned inside of the column. Each of the packing elements comprises a packing body surrounded by a protective cage assembly. The packing elements can be as previously described. Generally speaking, the column contains many layers of the packing elements.

A liquid inlet 24 is positioned near an upper end of the column to introduce a liquid stream into the column. The liquid stream flows downwardly though the packing elements. A gas inlet 26 is positioned near a lower end of the column to introduce a gas stream into the column. The gas stream flows upwardly through the packing elements and contacts the liquid stream.

The packing bodies according to this embodiment of the invention generally have a high surface area. For example, good results can be obtained where the packing body has a surface area/mass ratio which is in the range of 20 to 2,000 $cm^2/g$, preferably in the range of 50 to 500 $cm^2/g$.

The packing bodies generally also have a low apparent bulk density. For example, good results can be obtained where the packing body has an apparent bulk density in the range of about 0.001 to about 0.1 g/cc, preferably in the range of about 0.005 to about 0.05 g/cc.

In another embodiment, there is provided a method for packing a column with a high surface area material. A multiplicity of packing elements are introduced into the column. Each of the packing elements comprising a packing body having a high surface area/mass ratio surrounded by a protective cage assembly. In a preferred embodiment, each protective cage assembly has a near spherical outer surface and an outside diameter in the range of from about 0.01 to about 0.33 times the inside diameter of the column, preferably an outside diameter which is in the range of from about 0.03 to about 0.1 times the inside diameter of the column.

The packing bodies have a low apparent bulk density, for example, an apparent bulk density in the range of about 0.001 to about 0.1 g/cc, and a high surface area/mass ratio, for example, in the range of about 20 to about 2,000 $cm^2/g$. In an exemplary embodiment, the packing body comprises strands of material having a surface area/mass ratio in the range of about 20 to about 2,000 $cm^2/g$ and an apparent bulk density in the range of 0.001 to about 0.1 g/cc.

The cages most preferably have a generally spherical outer configuration and a diameter which is only a small fraction of the diameter of the column. The cages are constructed to have sufficient crush resistance to prevent the packing bodies from being crushed by the weight of the packing bodies and liquid holdup in the column.

Another embodiment of the invention provides a method of effecting gas/liquid contacting in a column. A liquid stream is introduced into an upper end of the column and flowed downwardly through a packing in the column. A gas steam is introduced into a lower end of the column and flowed upwardly through the packing in the column for countercurrent contact with the liquid stream. The packing is composed of cages each of which contains a low apparent bulk density, high surface area, packing body. The packing body is comprised of at least one strand of a metal or polymer material. The protective cage of comprised of a molded or stamped metal or polymer material of adequate stiffness to protect the packing body from crushing in the column.

In order to design a strong and rigid outside cage, the following criteria are preferably met:
a) Each individual cage si preferably easily opened and closed, so that the internal monofilament and/or multi-filament combination materials can be stuffed inside easily. Each cage thus preferably has "living hinge", six or more cross-link ribs and six or more tapered latches, both male and female for closing and opening.
b) The cage materials can be of any structurally sound material which will resist the column environment, generally either plastics or metals, but preferably plastics, for example, polypropylene (PP), polyethylene (PE), polystyrene (PS), polyvinylchloride (PVC), chlorinated polyvinylchloride (CPVC), polycarbonate (PC), Kynar®, Teflon®, fiberglass (FRP) and other plastic polymers.
c) The cage size can be varied as desired, but will generally range from ½" outside diameter (OD) to over 6" OD, preferably between 1" OD to 8" OD, and more preferably 1" OD, 2" OD, 3" OD, and 4" OD for ease of handling and good results.
d) Each individual cage when standing alone, preferably is capable of withstanding a loading force of at least 15 pounds or more without breaking apart in order to best avoid being damaged during shipment or use.

In order to design inside the component for each individual cage, the following criteria are preferably met:
a) The internals are preferably made of either metallic or plastic materials. Monofilament fibers, multi-filament fibers or combinations of both are preferred, generally in knitted, woven or non-woven form. In addition, the internals can also be stuffed with a combination of either or both plastic and metallic co-knitted elements.
b) The apparent bulk density of the internals can be varied to affect an increase or a decrease in total surface area easily. This freedom and ability to easily alter the surface area of the internals is a most unique merit of this invention. The density of the internals can be easily changed by choosing a thinner or thicker diameter fiber, or by stuffing the cage with denser or less dense fibers of the same diameter materials, or by stuffing the cage with a different amount of material.
c) A large choice of materials for the internals provides further strong merit for the invention. Also, the outside cage and the internals can be made of different materials.

The preferred embodiment of the invention comprises a rigid outside cage, with stuffed wire mesh materials inside. This embodiment greatly increases the overall surface area available to each random packing.

For a spherical cage, the size can be varied from ½" OD to over 12" OD, preferably from 1" OD to 4" OD depending needed parameters. For a cylindrical cage, diameters ranging from ½" OD to 12" OD, and length from ½" to 12", preferably from 1" OD to 8" OD and from 1" to 8" in length, as most appropriate, are expected to provide good results. For a polyhedral cage, for example box-shaped, size can be varied from ½" to 12" in width, ½" to 12" in length, and ½" to 12" in height, preferably from ½" to 8" in width, ½" to 8" in length, and from ½" to 8" in height as most appropriate. Cages with 4, 5, 6 or 8 or more sides can also be employed. Size can be varied from ½" to 12" in maximum span, ½" to 6" in maximum height, preferably 1" to 8" in maximum span, and 1" to 4" in maximum height, as most appropriate.

The cage can be made of either or both plastic materials and metals. For example, suitable plastic materials include, but are not limited to, polypropylene (PP), both high density and low density, HDPP and LDPP; polyethylene (PE), both high density, low density, linear high and linear low, HDPE, LDPE, LHDPE, and LLDPE; Polyvinyl Chloride (PVC); Chlorinated polyvinyl chloride (CPVC); Polystyrene (PS); Polycarbonate (PC); Kynar®; Teflon®); Nylon®; and Fiberglass (FRP). Suitable metallic materials include, but are not limited to, the following: stainless steel (all); nickel; monel; cobalt; aluminum; zinc; copper; brass; hastalloy; inconel; and zirconium.

Preferably, the cage is made with living a hinge for easy opening and closing, plus rigid ribs for supports and for strength.

The internal stuffed mesh-materials can be made by rolling knitted (for example, a Chore-Girl® scrub pad configuration) or randomly entangled (for example, a Scotch-Brit® scrub pad configuration) plastic fibers and/or metallic wires into the following shapes: spherical shape, cylindrical shape, rectangular shape, and polyhedral shapes; preferably with spherical and cylindrical shapes as most appropriate. The mesh material inside each individual cage can be made of either or both plastic materials and metals.

Suitable materials for forming the plastic internal mesh materials included, but not limited to, the following: polypropylene (PP), both high density and low density, HDPP and LDPP; polyethylene (PE), both high density, low density, linear high and linear low, HDPE, LDPE, LHDPE, and LLDPE; Polyvinyl Chloride (PVC); Chlorinated polyvinyl chloride (CPVC); polystyrene (PS); polycarbonate (PC); Kynar®; Teflon®; Nylon®; and fiberglass (FRP).

Suitable materials for forming the metallic mesh materials included but are not limited to, the following: Stainless steels (all); nickel; monel; cobalt; aluminum; zinc; copper; brass; hastalloy; inconel; and zirconium.

Furthermore, the internal knitted mesh material inside each individual cage can be made of many different plastic fiber materials. Suitable plastic materials include, but are not limited to, the following: monofilament fibers of PP, PE, PVC, CPVC, PS, PC, Kynar®, Teflon®, Nylon®; multi-filament fibers of PP, PE, PVC, CPVC, PS, PC, Kynar®, Teflon®, Nylon® and fiberglass (FRP).

The monofilament plastic fibers can be either flat or round in diameter, or have other cross sections. Typical fiber sizes are as follows:

| | |
|---|---|
| Flat wire | width = 0.031" (width) × 0.008" (thick) |
| | = 0.7874 mm (width) × 0.2032 mm (thick) |
| Round wire | wire diameter = 0.008" OD, and/or 0.011" OD. |
| | = 0.2032 mm OD, and/or 0.2794 mm OD. |

Multi-filament plastic fibers generally are generally round. Typical fiber sizes are as follows:

| | |
|---|---|
| Round wire | fiber diameter = 0.0009" OD, and/or 0.00036" OD. |
| | = 0.02286 mm OD, and/or |
| | 0.009144 mm OD. |

The internal mesh material inside each individual cage can also be made of the different metallic wire configurations. Typical metallic wire materials include, but are not limited to, the following:

Round metallic wires of: all stainless steel nickel monel cobalt, aluminum, zinc copper, brass, hastalloy, inconel and zirconium.

Metallic wedge-wires of: all stainless steel nickel monel cobalt, aluminum, zinc, copper, brass, hastalloy, inconel and zirconium.

Typical round wire diameter of the above materials are as follows:

| |
|---|
| Wire diameter = 0.006" OD and/or 0.011" OD. |
| = 0.1524 mm OD and/or 0.2794 mm OD. |

As an exemplary embodiment, for a typical new 2" OD packing using polypropylene monofilament fibers, the internal knitted mesh material inside each individual cage can be made to the following specifications:

| | |
|---|---|
| Wire size = | 0.031" (width) × 0.008" (thick) |
| Wire length = | 65'–0" (length) |
| Total weight = | 2.5 gm |
| Surface area of wires = | 0.423 ft² |
| Surface area of cage = | 0.08682 ft² |
| Total surface area per 2" OD packing = | 0.51 ft² |
| Apparent density per 2" OD stuffed packing = | 0.12 gm/cm³ |

The following exemplary range of specifications for all other spherical shapes and sizes of our new random packing using plastic monofilament fibers are as follows:

Total surface area per 1" OD stuffed packing varies from 0.01 ft² to 0.32 ft², preferably from 0.05 ft² to 0.08 ft².

Total surface area per 2" OD stuffed packing varies from 0.1 ft² to 2.55 ft², preferably from 0.38 ft² to 0.64 ft².

Total surface area per 3" OD stuffed packing varies from 0.34 ft² to 8.61 ft², preferably from 1.29 ft² to 2.15 ft².

Total surface area per 4" OD stuffed packing varies from 0.82 ft² to 20.40 ft², preferably from 3.06 ft² to 5.10 ft².

Total surface area per 5" OD stuffed packing varies from 1.59 ft² to 39.84 ft², preferably from range from 5.98 ft² to 9.96 ft².

Total surface area per 6" OD stuffed packing varies from 2.75 ft² to 68.85 ft², preferably from 10.33 ft² to 17.21 ft².

Total surface area per 7" OD stuffed packing varies from 4.37 ft² to 109.33 ft², preferably from 16.40 ft² to 27.33 ft².

Total surface area per 8" OD stuffed packing varies from 6.53 ft² to 163.20 ft², preferably from 24.48 ft² to 40.80 ft².

Total surface area per 9" OD stuffed packing varies from 9.29 ft² to 232.37 ft² preferably from 34.86 ft² to 58.09 ft².

Total surface area per 10" OD stuffed packing varies from 12.75 ft² to 318.75 ft², preferably from 47.81 ft² to 79.69 ft².

Total surface area per 11" OD stuffed packing varies from 16.97 ft² to 424.26 ft², preferably from 63.64 ft² to 106.06 ft².

Total surface area per 12" OD stuffed packing varies from 22.03 ft² to 550.80 ft², preferably from 82.62 ft² to 137.70 ft².

All of the above spherical dump packing sizes, if made of polypropylene cage and internal materials, will have an apparent density varies from 0.05 gm/cm³ to 0.45 gm/cm³, preferably from 0.10 to 0.30 gm/cm³.

Equivalent cylindrical-shape random packings, which have similar size and volume as the spherical ones, if made of polypropylene cage and internal materials, will have similar total surface areas as the round spherical ones, and similar apparent density varies from 0.05 gm/cm³ to 0.45 gm/cm³, preferably from 0.10 to 0.30 gm/cm³.

Other equivalent polygonal-shape random packings, which have similar size and volume as the spherical ones, if made of polypropylene cage and internal materials, will have similar total surface areas as the round spherical ones, and similar apparent density varies from 0.05 gm/cm³ to 0.45 gm/cm³, preferably from 0.10 to 0.30 gm/cm³.

Further, the spherical, cylindrical and polyhedral-shaped packing cages can also be stuffed with internal combination mesh materials, these combination-mesh-materials can be as follows: a combination of any two or more of one type of monofilament polymer with another different type of monofilament polymer, these polymers are chosen among monofilament fibers of PP, PE, PVC, CPVC, PS, PC, Kynar®, Teflon®, Nylon®, for example an internal co-knit mesh of monofilament of polypropylene and Teflon; a combination of any two or more of one type of monofilament polymer with another different type of multi-filament polymer, for example chosen among monofilament fibers of PP, PE, PVC, CPVC, PS, PC, Kynar®®, Teflon®, Nylon® and multi-filament of fiberglass (FRP), for example, an internal co-knit mesh of monofilament polypropylene and multi-filament fiberglass; a combination of any two or more of one type of metal wires with monofilament polymer materials, for example metal wires chosen among one of the following: all stainless steel, nickel, monel cobalt, aluminum, zinc, copper, brass, Hastalloy, Inconel, and zirconium with a monofilament fiber can be chosen among a polymer of: PP, PE, PVC, CPVC, PS, PC, Kynar®, Teflon®, and Nylon®, for example, an internal co-knit mesh of monofilament polypropylene and 316L stainless steel; combinations of any two or more of one type of metal wires with multi-filament polymer materials, the metal wires being chosen among one of the following: all stainless steels, nickel, monel, cobalt, aluminum, zinc, copper, brass, Hastalloy, Inconel, zirconium, with the multi-filament fiber being chosen among PP, PE, PVC, CPVC, PS, PC, Kynar®, Teflon®, Nylon® and fiberglass (FRP), for example an internal co-knit mesh of multi-filament fiberglass and 316L stainless steel.

Further, if desired, in all of the above examples using internal knitted-meshed plastic materials, the internal knitted-meshed plastic materials can be replaced with woven-meshed plastic materials, for example internal co-woven mesh of mono-filament polypropylene and 316L stainless steel can replace internal co-knit mesh of monofilament polypropylene and 316L stainless steel.

EXAMPLES

General

All examples given below were based on 2" OD sized, polypropylene cage, with polypropylene mono-filament internals.

Testing criteria:
a) Cage size: 2" OD polypropylene rigid cage, each empty cage weighing 0.2 oz, i.e., 0.0125 lb, or 5.67 gm., with about 4.0 cubic inches, i.e., 0.002315 cubic feet, or 65.55 cubic centimeters in total external volume. The internal ID is 1.75", with wall thickness of 0.125", total internal volume is 2.806 cubic inches, or 45.985 cubic centimeters.
b) Cage internals: polypropylene flat wire, 0.008" (thickness)×0.031" (width), i.e. 0.02 mm (thick)×0.784 mm (width), knitted mesh, 24 needles, each one 2.5" open-mesh diameter×7.5" long, weighs 0.088 oz, i.e., 0.005512 lb, or 2.5 gm.
c) The total weight per cage (with stuffed mesh) is 0.288 oz, i.e., 0.018 lb., or 8.2 gm.
d) When the internal mesh is stuffed into the 2" OD cage, the apparent density is 0.0691 oz/cubic inch, i.e., 7.46 lb/cubic feet, or 0.1195 gm/cubic centimeter.
e) The total surface of one fully stuffed cage is equal to the sum total of wire mesh surface and cage surface area.

Total surface area of wire mesh is 60.84 square inches, i.e., 0.423 square feet, or 0.0393 square meters.

Total surface area of the external cage is 12.5 square inches, i.e., 0.08682 square feet, or 0.0080645 square meters.

Therefore, total surface area available for one 2" OD stuffed random-packing is 73.34 square inches, i.e., 0.51 square feet, or 0.04736 square meters.

f) The packing was evaluated in test equipment which included
A 16.875-inch internal diameter packed column, loaded with 122.4" height of the above described 2" OD random packings;
An air blower;
An annubar for air flow measurement;
An orifice plate for water flow measurement;
A differential pressure cell for pressure-drop readings;
A water flow control system;

Temperature indicators were located in all inlet and outlet streams of the column to evaluate mean temperatures of the flow system. Water and air flow counter-currently through the packed bed. A 40-hp blower was used to supply atmospheric air to the bottom of the column. The inlet air was uniformly introduced below the packing by means of a multibeam-gas-injection support plate. A 4.0-in orifice plate was used to cover the desired range of air mass flows.

Pressure-drop measurements were carried out in the column which was packed to an average depth of 10.2 ft. The test fluids are air and water, and operations were at ambient conditions. Tap water is fed directly to the column and then distributed evenly over the top of the packing by means of a lateral pipe distributor containing 40 drip-points/ft$^2$ column cross section. A leak check (filling the column with water) is performed initially to minimize experimental error in the pressure drop readings due to air loss.

Air flow rates are measured by an annubar and are controlled by a butterfly valve that sends air to a purge. Water flow rates are measured through an orifice plate and controlled by a valve in the line. Signal outputs of both flow meters were wired to a Fisher-Rosemount computer console, which allows rapid collection and storage of operating data Pressure drop across the packed section is measured by means of a differential pressure cell ranged from 0.0 to 30.0-in H$_2$O.

The test procedures are as follow:

Pressure drop tests were carried out at five liquid flow rates: 2500, 5000, 7500, 10000, and 15000 lb/hr. initially, after observing a steady liquid flow at the desired flow rate, the air rate was increased until flooding was observed. Pressure drop measurements were then taken as the airflow was reduced in incremental steps. The low-pressure side of the pressure drop transmitter was drained immediately after flooding at each liquid flow rate, to ensure accurate readings.

Figure 5:
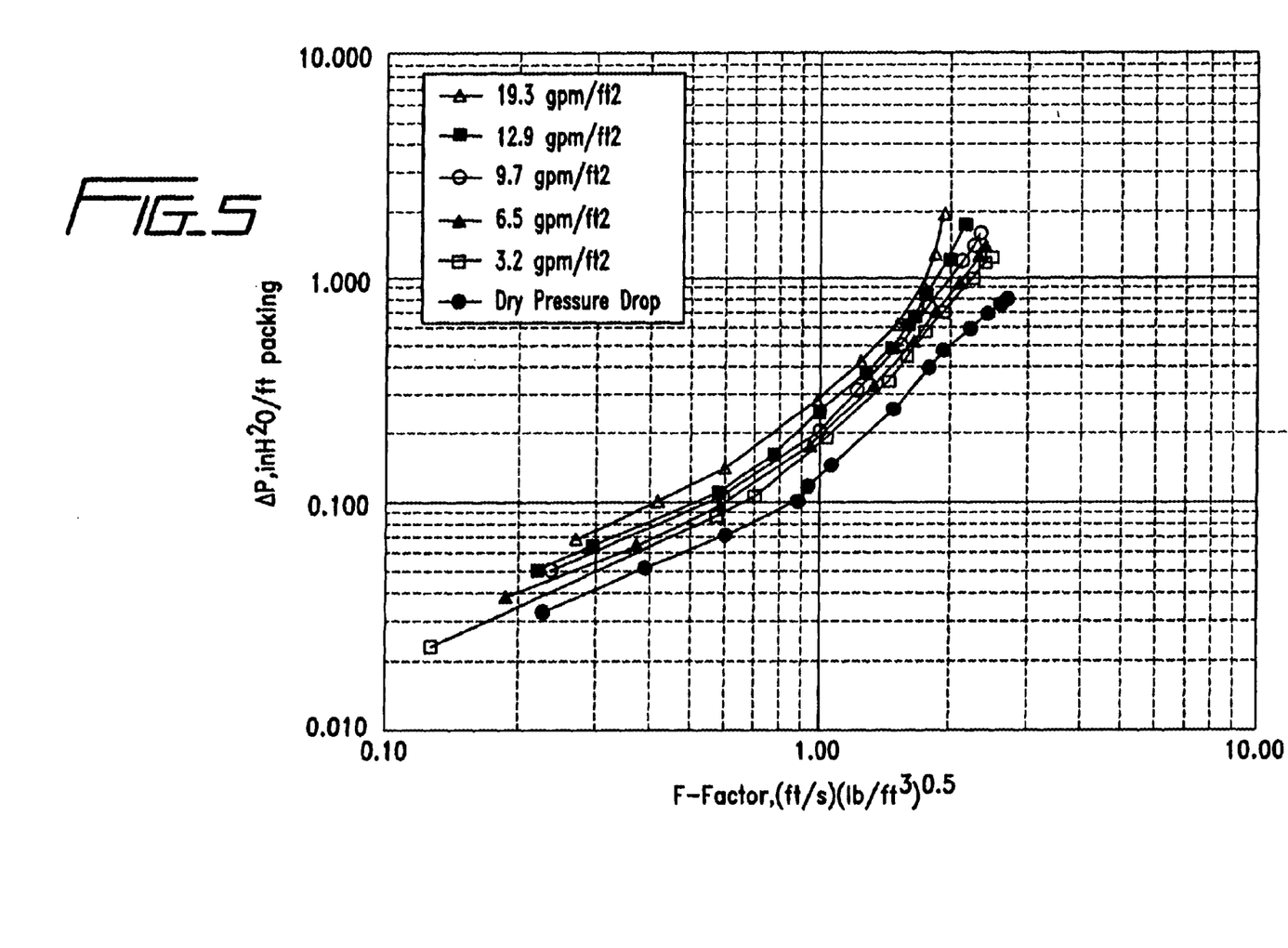
FIG. 5 is a graph showing experimental results obtained from the column shown in FIG. 4.

Dry bed pressure drop runs (no liquid flowing) were also carried out. The apparatus used is schematically shown in FIG. 4. Pertinent pressure drop data are summarized below. The hydraulic results are shown in FIG. 5, where the pressure drop per foot of packing is plotted as a function of F-factor and liquid rate.

The F-factor is defined as follows:

$$\text{F-factor} = U_g \, (\rho_g)^{0.5}$$

where: Ug=Superficial gas velocity, ft$^3$/ft$^2$-s $\rho_g$=Gas density, lb/ft$^3$ Two typical examples of hydraulic testing results, using the 2.0-inch random packing, are as follow:

Example 1

| Operating data: | |
|---|---|
| Water flow rate = | 9900.0 lb/hr |
| Air flow rate = | 511.0 ACFM |
| Column diameter = | 16.875" ID |
| Random packing = | 2" OD |
| Performance data: | |
| Pressure drop per ft. of packing = | 0.4806 inch-of-water |
| F-factor = | 1.4572 (ft/s) (lb/ft$^3$)$^{0.5}$ |
| Liquid loading rate (water) = | 12.78 gpm/ft$^2$ |

Conclusion: when the 2" OD random packing is subjected to the above testing criteria, i.e. running at 9,900 lb/hr (pound per hour) liquid rate and 511 ACFM (actual cubic feet per minute) air rate, the performance is excellent, with less than 0.5 inch-of-water pressure drops per foot of random packing material. The liquid loading rate has achieved 12.78 gpm/ft$^2$ (gallons per minute per square foot) level, which clearly indicates the new random packing performs significantly above the norm of 2 to 10 gpm/ft$^2$ level of other types of random packing materials widely used in the industry.

Example II

| Operating data: | |
|---|---|
| Water flow rate = | 14900.0 lb/hr |
| Air flow rate = | 432.0 ACFM |
| Column diameter = | 16.875" ID |
| Random packing = | 2" OD |
| Performance data: | |
| Pressure drop per ft. of packing = | 0.4122 inch-of-water |
| F-factor = | 1.2346 (ft/s) (lb/ft$^3$)$^{0.5}$ |
| Liquid loading rate (water) = | 12.24 gpm/ft$^2$ |

Conclusion: when the 2" OD random packing is subjected to the above testing criteria, i.e., running at 14,900 lb/hr (pound per hour) liquid rate and 432 ACFM (actual cubic feet per minute) air rate, the performance is excellent, with less than 0.5 inch-of-water pressure drop per foot of random packing material. The liquid loading rate has achieved 12.24 gpm/ft$^2$ (gallons per minute per square foot) level, which performs significantly above the norm of 2 to 10 gpm/ft$^2$ level of other types of random packing materials in the industry.

The above examples indicate the new type of random packing material clearly performs superiorly to most third generation random packing materials sold in the market today.

The main reason is simply because the packing has the freedom and ability to vary the overall internal surface area to each piece of our random-packing easily. This is done simply by stuffing different diameter mono-filament and/or multi-filament fibers inside each of the same rigid cage.

This new random packing can easily provide more than double the total available surface area of similar packing materials used widely by the industry, yet the new packing does not draw too excessive pressure drop across the packing bed, the pressure drop is similar to those packings used in the industry.

Due to a significant increase in total surface area of this new design, the liquid-loading capability of the new packing clearly stands out among the crowd, reaching a level of nearly 20 gpm/ft$^2$, yet with less than one inch of water-column in pressure drop per foot of our packing. See FIG. 5 for details. This liquid-loading number is anywhere from two to ten folds better than most comparable ones widely used today.

The rigidity design of the cage, which can stand over 15-lb pressure per 2" packing piece without breaking, offers a superior strength over those existing packings in the known art.

Besides flexibility in varying total surface area, the new packing also offers flexibility in choice of materials.

For example, we can use a rigid 2" OD polypropylene cage, stuff an all metal knitted mesh of 316 ss (i.e., 316 stainless steel) wires, say 0.011" in diameter, therefore we have created a composite material which combines the excellent hydrophilic ability of the 316 ss wire, as well as excellent oleophilic ability of the polypropylene cage, this will facilitate better contact surfaces for gas-liquid reactions inside a given column, thus improve the overall HETP (i.e., height equivalent to theoretical plate), which improves the mass transfer between the gas phase and the liquid phase reaction.

This ability alone is also unique for the new invention. In fact, the same plastic cage can be stuffed with a combination of Teflon and 316 ss co-knit mesh wires to create a plastic-metal-and-plastic internal, not only for better mass transfer properties, but also for corrosion considerations.

While certain preferred embodiments of the invention have been described therein, the invention is not to be construed as being so limited, except to the extent that such limitations are found in the claims.

What is claimed is:

1. A method of effecting gas/liquid contacting in a column, comprising introducing a liquid stream into an upper end of a column and flowing said liquid stream downwardly through a packed bed of packing elements in the column;

introducing a gas stream into a lower end of the column and flowing said gas stream upwardly through the packed bed of packing elements in the column for countercurrent contact with the liquid stream;

wherein each packing element is composed of a spherical cage which contains a low apparent bulk density, high surface area, packing body, each spherical cage having sufficient crush resistance to prevent the packing body contained within the cage from being crushed by the weight of the packing bodies and liquid holdup in the column, and a plurality of said packing elements are dumped randomly and evenly into said column to form the packed bed.

2. A method as in claim 1 wherein the packing body comprises strands of material having a surface area/mass ratio in the range of about 20 to about 2,000 cm$^2$/g and an apparent bulk density in the range of 0.001 to about 0.1 g/cc.

3. A method as in claim 1 wherein the spherical cage has a diameter which is only a small fraction of a diameter of the column.

4. A method as in claim 1 wherein the cage has an outside configuration and a size which permits it to be dumped randomly and evenly into a column.

5. A method as in claim 1 wherein each spherical cage comprises a pair of generally hemispherical molded cage elements joined in a mouth to mouth relationship by snap fitting elements and a hinge which facilitates interlocking the snap fitting elements.

6. A method as in claim 1 wherein the cage has a crush strength in the range of about 10 to about 200 pounds.

7. A method as in claim 1 wherein the packing body has a surface area/mass ratio which is in the range of 20 to 2,000 cm$^2$/g.

8. A method as in claim 1 wherein the packing body has an apparent bulk density in the range of about 0.001 to about 0.1 g/cc.

9. A method as in claim 5 wherein the cage is comprised of a molded or stamped metal or polymer material of adequate stiffness to protect the packing body from crushing in the column.

10. A method as in claim 4 wherein the cage has a near spherical outer surface and an outside diameter in the range of from about 0.01 to about 0.33 times the inside diameter of the column.

11. A method as in claim 4 wherein the cage has a near spherical outer surface and an outside diameter in the range of from about 0.03 to about 0.1 times the inside diameter of the column.

* * * * *